(12) United States Patent
Albrecht et al.

(10) Patent No.: US 11,027,842 B1
(45) Date of Patent: Jun. 8, 2021

(54) APPARATUS AND SYSTEM FOR UAV RELEASE

(71) Applicant: The United States of America, as represented by the Secretary of the Navy, Arlington, VA (US)

(72) Inventors: Nicholas H. Albrecht, Ridgecrest, CA (US); Vincent R. Schuetz, Ridgecrest, CA (US); Pavel K. Rybakov, Ridgecrest, CA (US); Chase A. York, Ridgecrest, CA (US); Scott D. Slaughter, Ridgecrest, CA (US); Derek A. Hamel, Ridgecrest, CA (US)

(73) Assignee: The United Statas of America. as represented by the Secretary of the Navy, Washington, DC (US)

( * ) Notice: Subject to any disclaimer, the term of this patent is extended or adjusted under 35 U.S.C. 154(b) by 387 days.

(21) Appl. No.: 16/007,733

(22) Filed: Jun. 13, 2018

(51) Int. Cl.
 *B64D 1/02* (2006.01)
 *B64C 39/02* (2006.01)
 *B64D 5/00* (2006.01)

(52) U.S. Cl.
 CPC .............. *B64D 1/02* (2013.01); *B64C 39/024* (2013.01); *B64D 5/00* (2013.01); *B64C 2201/206* (2013.01)

(58) Field of Classification Search
 CPC .......... B64D 1/02; B64D 5/00; B64C 39/024; B64C 2201/206
 See application file for complete search history.

(56) References Cited

U.S. PATENT DOCUMENTS

| | | | | |
|---|---|---|---|---|
| 4,208,949 A | * | 6/1980 | Boilsen ..................... | B64D 1/04 244/137.4 |
| 4,256,012 A | * | 3/1981 | Cowart ..................... | B64D 1/08 244/118.1 |
| 5,763,811 A | * | 6/1998 | Ruzicka ..................... | B64C 1/22 244/137.1 |
| 8,256,339 B1 | * | 9/2012 | Hamalian ............... | F41F 3/052 89/1.815 |
| 10,179,648 B2 | * | 1/2019 | Chin ........................ | B64D 5/00 |
| 2004/0232282 A1 | * | 11/2004 | Dennis ...................... | B64F 1/04 244/110 E |
| 2005/0151009 A1 | * | 7/2005 | Roeseler ................... | B64F 1/06 244/63 |
| 2010/0012774 A1 | * | 1/2010 | Fanucci ................. | F42B 12/365 244/49 |
| 2015/0101478 A1 | * | 4/2015 | Palmer ................... | F41F 3/0406 89/1.82 |
| 2019/0063881 A1 | * | 2/2019 | Abramov ............... | G05D 1/104 |

* cited by examiner

*Primary Examiner* — Brian M O'Hara
*Assistant Examiner* — Keith L Dixon
(74) *Attorney, Agent, or Firm* — Naval Air Warfare Center Weapons Division; James M. Saunders

(57) ABSTRACT

Embodiments are directed to releasing smaller unmanned aerial vehicles from larger unmanned aerial vehicles. Apparatus and system embodiments are disclosed for physically retaining and ejecting the smaller unmanned aerial vehicles, including the communication networks associated with the command and control of both the smaller unmanned aerial vehicles and the larger unmanned aerial vehicles.

14 Claims, 10 Drawing Sheets

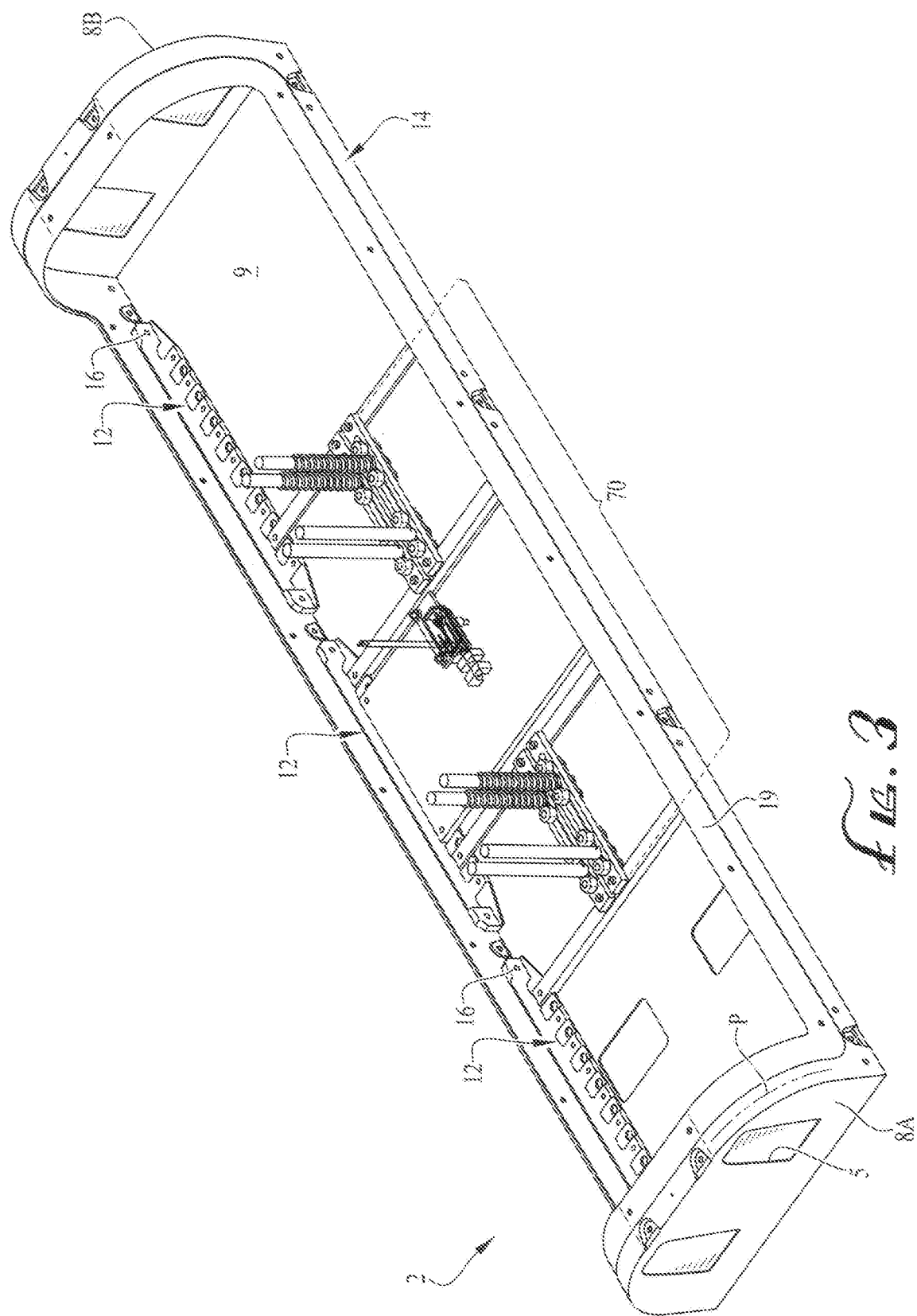

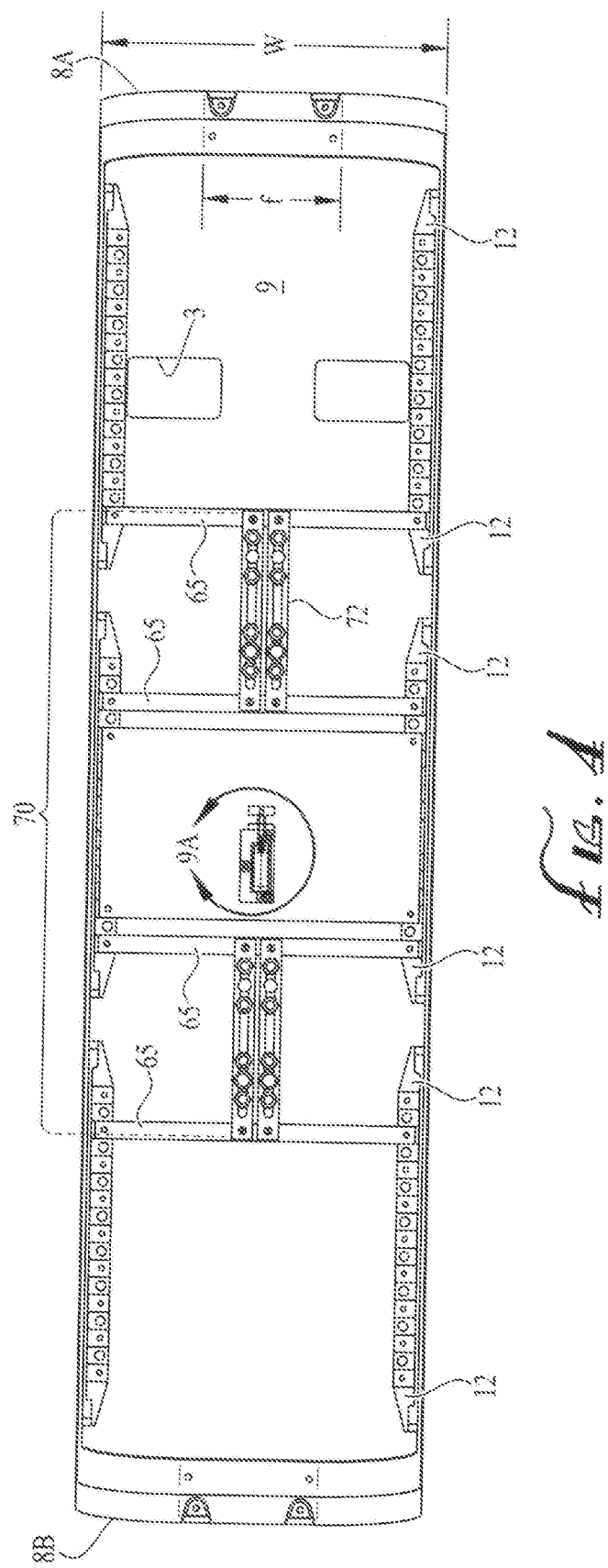

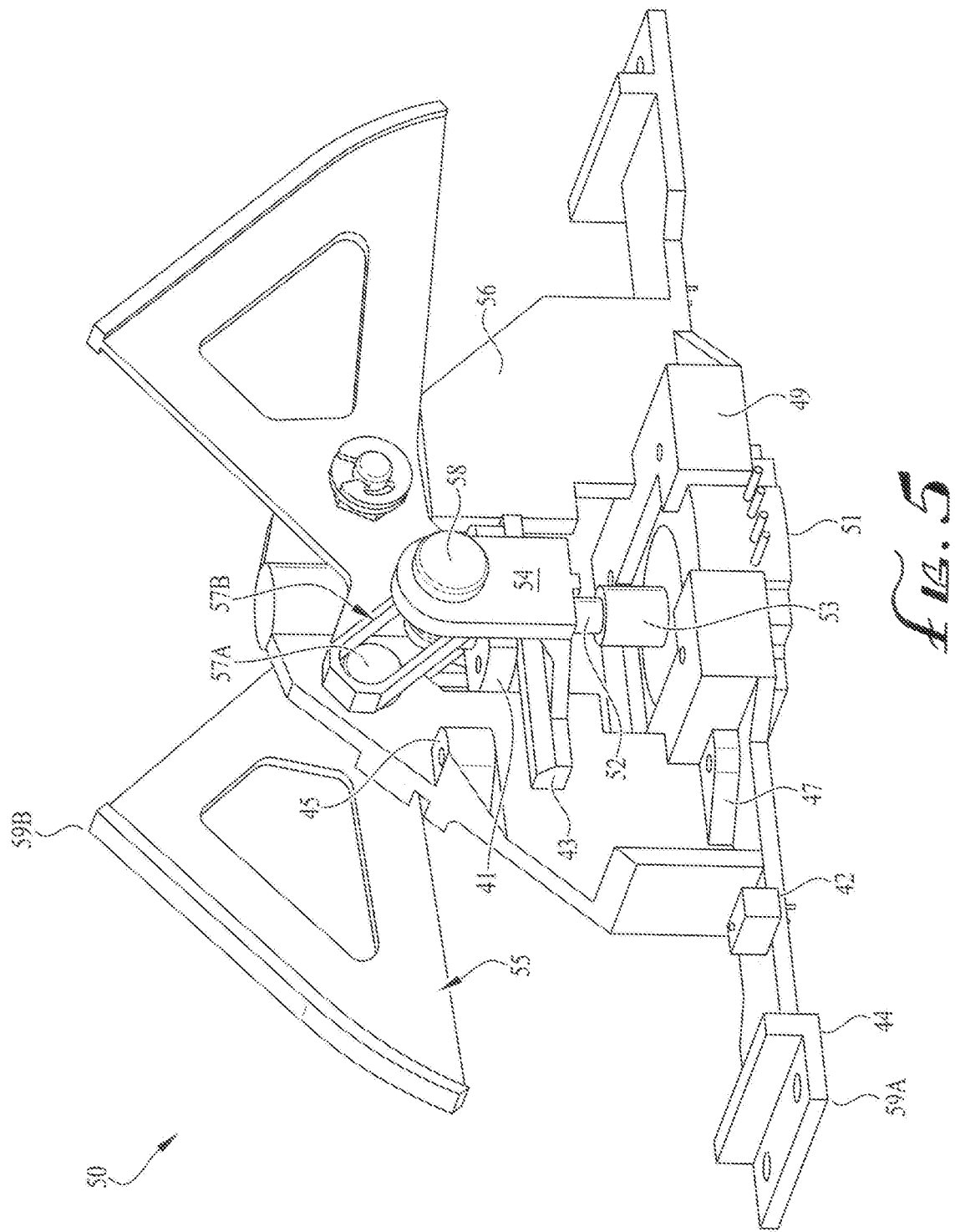

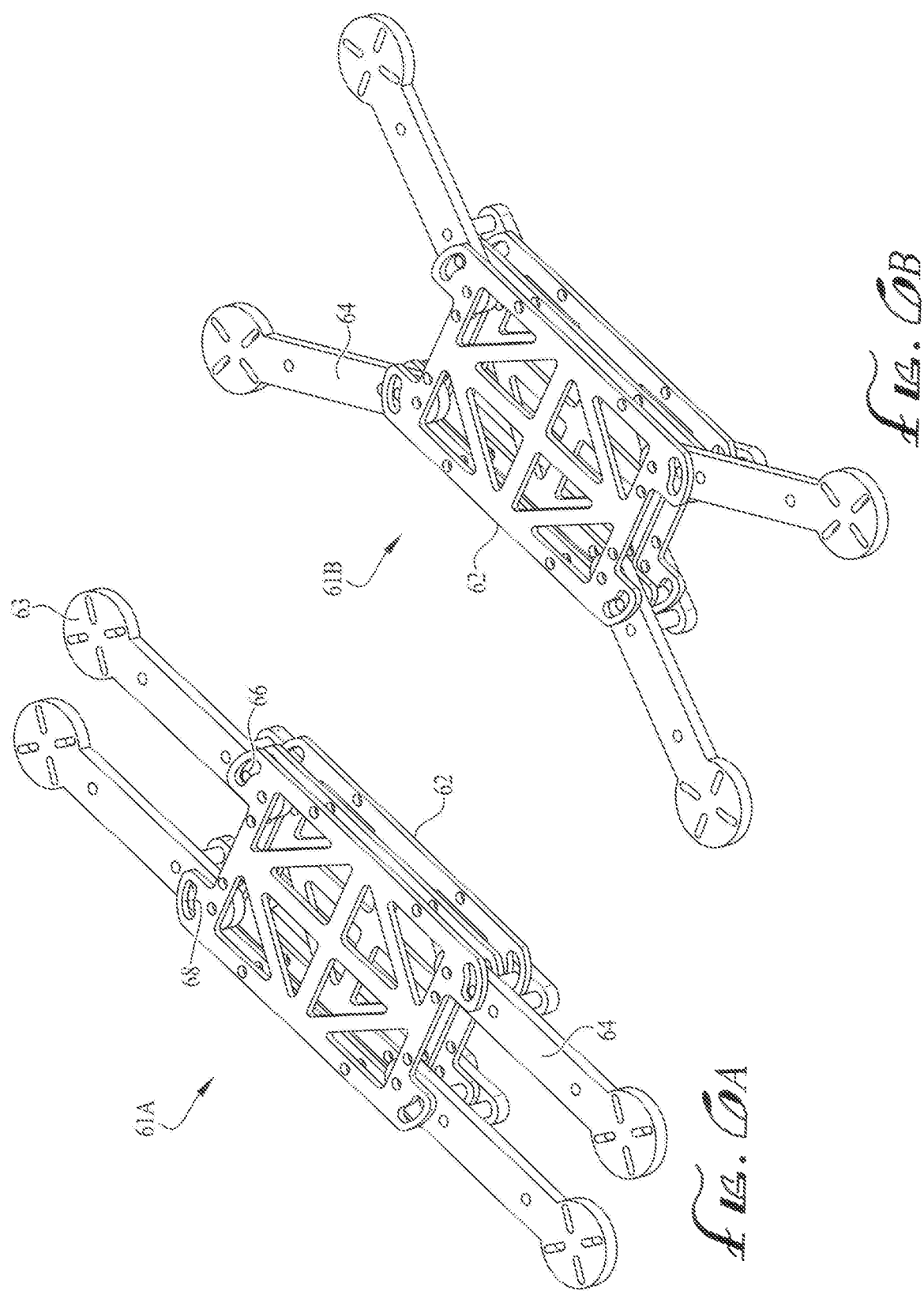

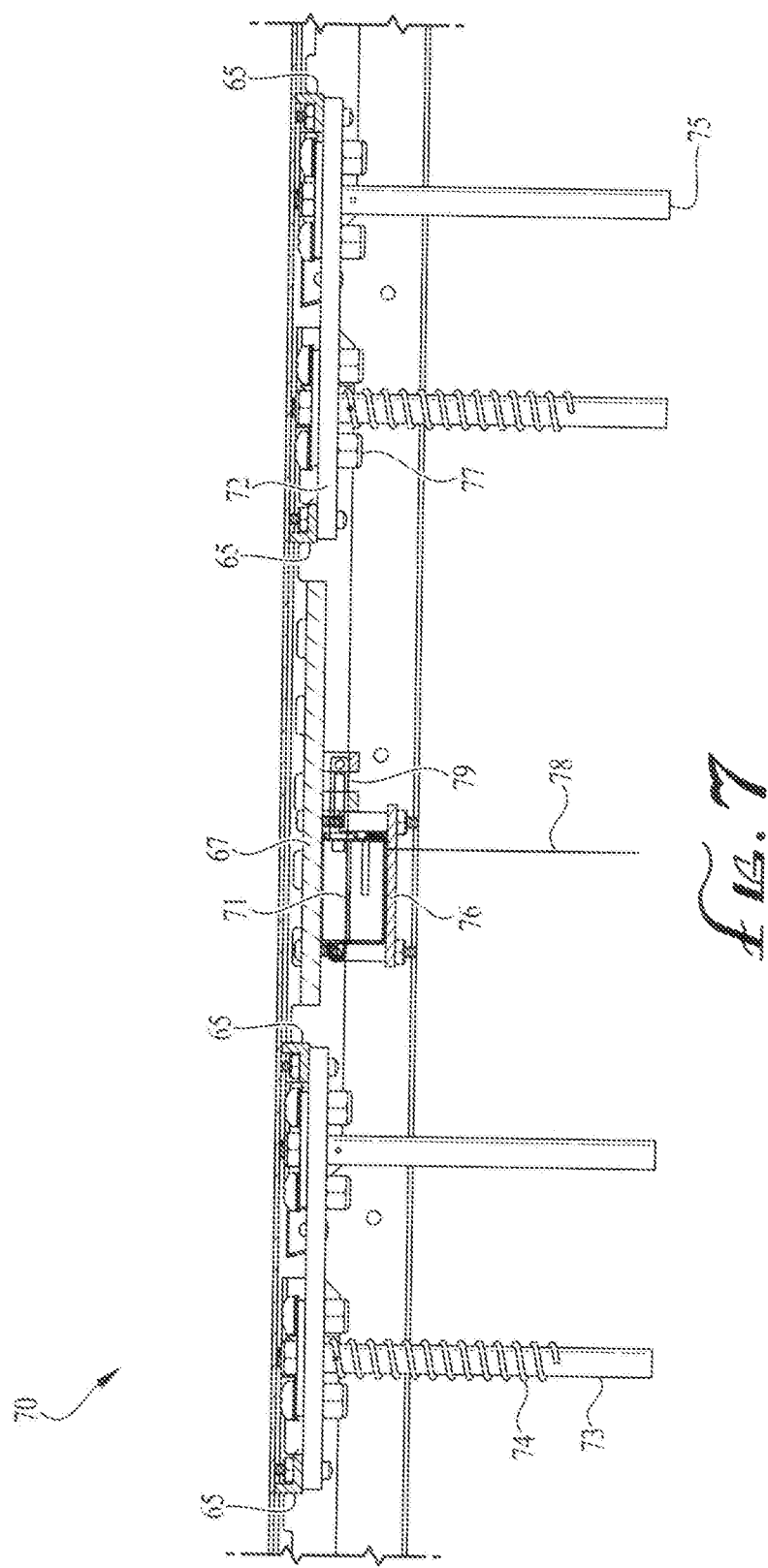

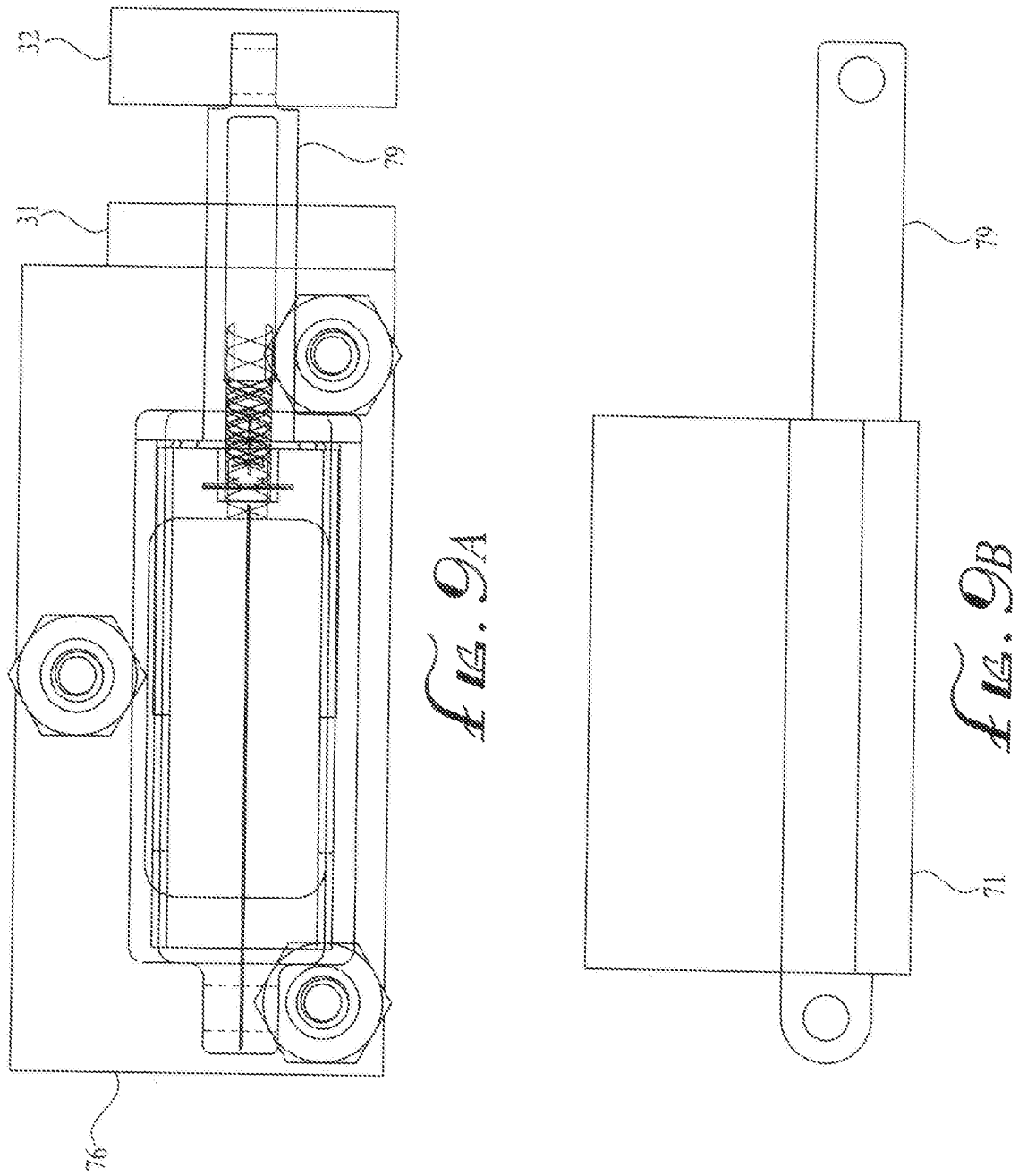

APPARATUS AND SYSTEM FOR UAV RELEASE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

The embodiments generally relate to releasing unmanned aerial vehicles.

BRIEF DESCRIPTION OF THE DRAWINGS

FIG. 3 is a perspective view of a baseplate (including rectangular section, opposing ends, and lip with shelf) and mounting rails, according to some embodiments.

FIG. 4 is a view from underneath the bay with the cover removed to show internal components, according to some embodiments.

FIG. 5 is a perspective view of a hinge assembly, according to some embodiments.

FIG. 6A is a perspective view of a deployable UAV's frame and arms in a first (retained—arms folded) geometry, according to the embodiments.

FIG. 6B is a perspective view of the deployable UAV's frame and arms in a second (flight—arms extended) geometry, according to the embodiments.

FIG. 7 is a partial side and partial section view of internal bay components and a rack and release mechanism, according to some embodiments.

FIG. 9A is a detail view showing a linear actuator and associated components depicted in FIGS. 4 and 7, according to the embodiments.

FIG. 9B is a detail view of the linear actuator and a linear actuator arm, according to the embodiments.

Figure 1:
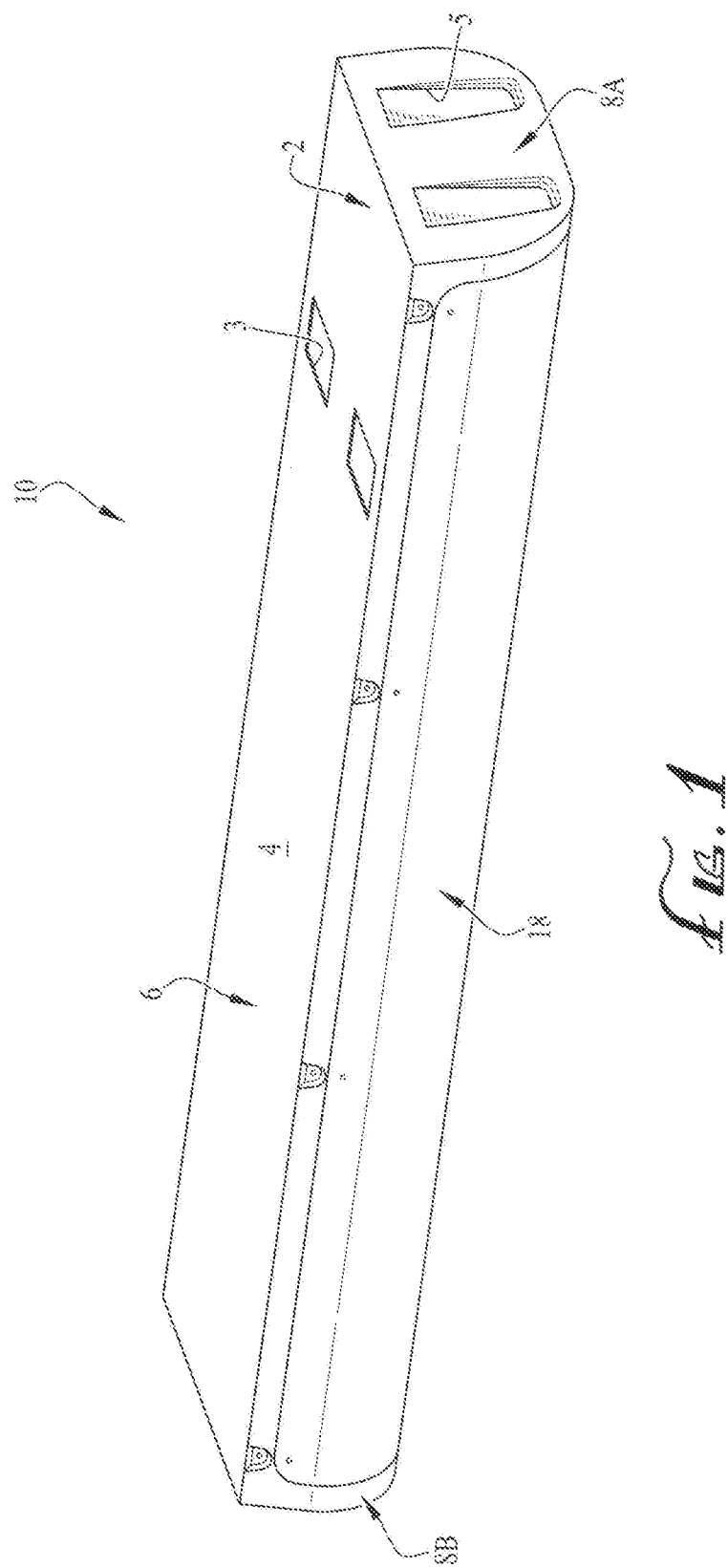
FIG. 1 is a perspective view of an assembled overhead bay, according to some embodiments.

It is to be understood that the foregoing general description and the following detailed description are exemplary and explanatory only and are not to be viewed as being restrictive of the embodiments, as claimed. Further advantages of the embodiments will be apparent after a review of the following detailed description of the disclosed embodiments, which are illustrated schematically in the accompanying drawings and in the appended claims.

DETAILED DESCRIPTION OF EMBODIMENTS

Embodiments may be understood more readily by reference in the following detailed description taking in connection with the accompanying figures and examples. It is understood that embodiments are not limited to the specific devices, methods, conditions or parameters described and/or shown herein, and that the terminology used herein is for the purpose of describing particular embodiments by way of example only and is not intended to be limiting of the claimed embodiments. Also, as used in the specification and appended claims, the singular forms "a," "an," and "the" include the plural.

Embodiments generally relate to carrying payloads such as unmanned aerial systems (commonly abbreviated UAS), sometimes called unmanned aerial vehicles (commonly abbreviated UAV), herein. Embodiments attempt to use the acronym UAV throughout for clarity. Likewise, embodiments include radio frequency (RF) payloads mounted inverted with an RF transparent cover to maximize RF payload performance. This provides shielding between an air vehicle and its payloads, improved structural and vibrational rigidity, reduced weight, and easier access to payloads.

Current constructions use apertures, holes, or external antennas as part of the airframe or pods to allow adequate RF performance. The suggested approach supports RE performance, while reducing clutter for RE active and passive elements, provides for improved aerodynamic performance, reduced weight, and increased structural performance.

Embodiments provide an inverted cradle construction allowing payloads to be mounted overhead, thus hanging the payloads and allowing them to look down while in flight. This concept creates an optimization in reduced clutter for RF active and passive elements alike inside the bay, thus creating a stronger connection between the payloads and items of interest. Embodiments use currently accepted mounting rails for mounting overhead bays to airframes. A fiberglass bay cover is used instead of traditional carbon fiber and composites to allow for RF transparency into and out of the bay. The outside form factor of the bay (in reference to mounting to the fuselage) is identical to the bay, thus no additional modifications to the outer mold line or mating faces are needed.

Embodiments mount hardware via a base plate directly to airframe attachment points, mounting payloads to the base plate, and then attaching an RF transparent cover. The bay cover may or may not include vents to cool payloads. The inverted cradle construction allows payloads to be mounted overhead, hanging the payloads and allowing them to look down during flight. Embodiments are referred to as a payload system, which allows a physically smaller UAV to be released, sometimes referred to as ejected, from a physically larger UAV, with minimal degradation to flight performance. This improves delivery to the area of responsibility (AOR), and reduces some manual activities such as, for example, manual transportation, launching, and operation, including remote operation.

Small Group 1 UAV(s) (twenty pounds or less) are limited in their mission scope with respect to the mission duration and operating ranges, causing the effective operating areas to be nearby the operator's location. Furthermore, these UAV(s) are often manually transported taking up valuable space, and launched into their respective area of operations. With a severely limited service life due to battery power limitations, much of their power is spent achieving safe standoff from the operators. Embodiments provide a bolt-on payload system that enables larger UAV(s) to deliver Group 1 UAV(s) beyond existing ranges currently used while enabling this data to be distributed across a data-linked network.

Current payload designs for larger UAV(s) inhibit the release of any significantly-sized items due to solid construction of the bay skin. This requires permanent cutouts of the outer skin. The permanent cutout negatively affects flight performance of the airframe over any operationally representative flight durations. Through intermittent opening and closing, the embodiments' doors provide a valid way of safely controlling and jettisoning large items away from the airframe during flight conditions without significantly reduced effects on airframe performance. Additionally, the bay's ejection control encompasses electrically controlling the small UAV while retained in the bay, jettisoning the item, and controlling the item post ejection (throughout the entire flight of the UAV during its mission). The UAV is controlled post ejection via an electronic control stack including a data link radio card, micro-controller, and a single board computer. Lastly, the datalink relay housed within the bay provides the ability for forward positioned operators to take control of the released UAV during its mission, or subscribe to its payload feed from the ground.

Apparatus and System Embodiments

Although the embodiments are described in considerable detail, including references to certain versions thereof, other versions are possible. Examples of other versions include performing alternate combinations and sequencing of the components to optimize performance based on specific operating environments. Therefore, the spirit and scope of the appended claims should not be limited to the description of versions included herein.

Figure 8:
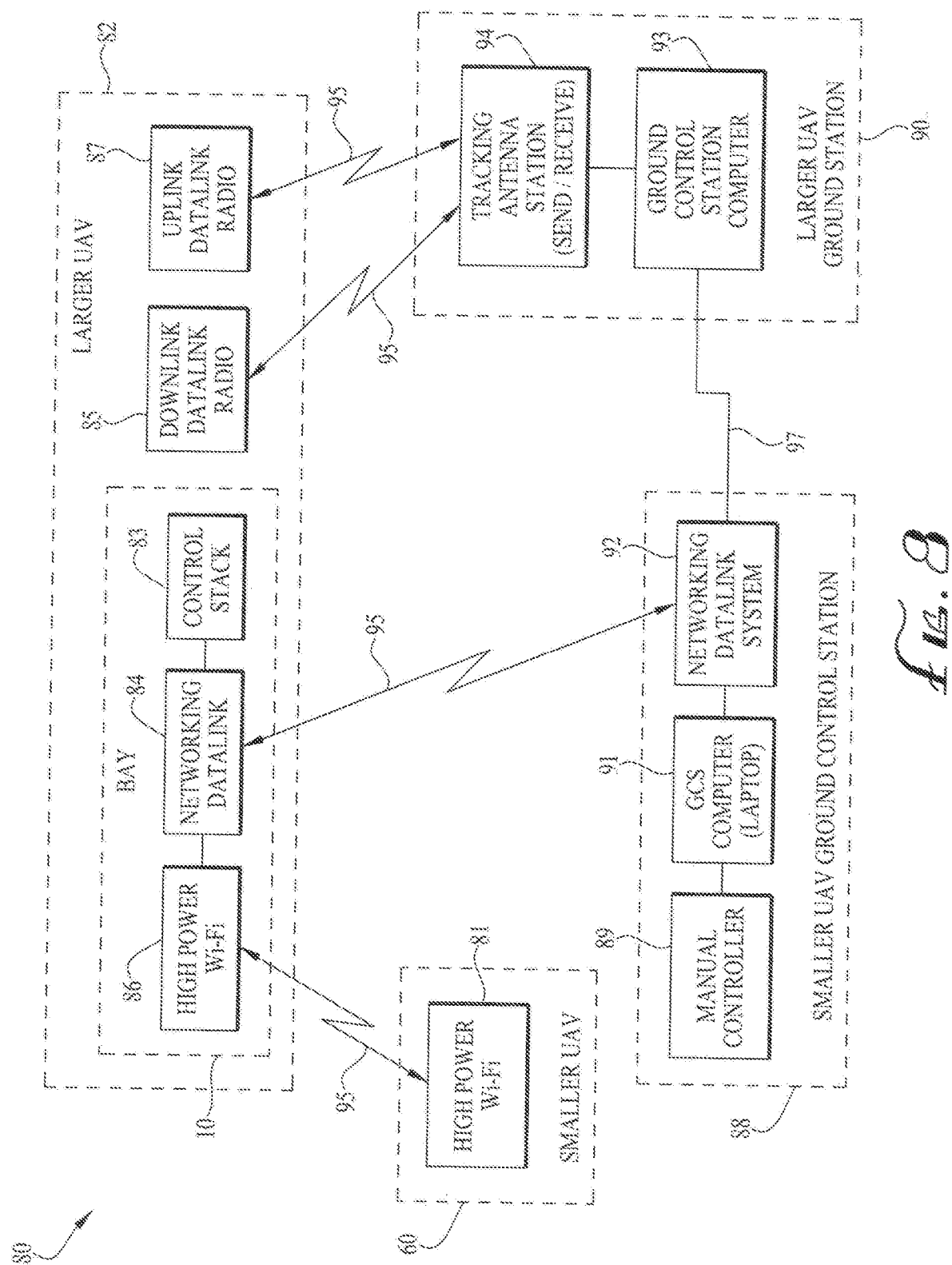
FIG. 8 is an exemplary operating environment, including a data link network and associated ground command and control stations, according to some embodiments.

In the accompanying drawings, like reference numbers indicate like elements. The embodiments illustrate a UAV release apparatus and system and associated components (FIGS. 1 through 7, and 9A & 9B), as well as an exemplary operating environment (FIG. 8). The system can also be referred to as a bomb bay UAV release system, and other variations. Referring to FIGS. 1, 2A, 3, & 4, embodiments include a baseplate 2. The baseplate 2 is a structural composite material (such that the baseplate is rigid) or metallic material and has a rectangular body section 6 and two opposing end plates 8A & SB. The rectangular body section 6 has an upper surface 9 and a lower surface 4. The "upper surface" 9 is referred to as such, based on viewing the inverted views shown in FIGS. 2A, 3, & 4. Consistency is, accordingly, maintained throughout. Additionally, the "upper surface" 9 can also be referred to as a "top flat portion" or "top flat surface" of the baseplate 2.

Each of the two opposing end plates 8A & SB extends up from upper surface 9 at a different short end of rectangular body section 6 than the other of the two opposing end plates 8A & SB. In some embodiments, the base plate 2 is about forty inches in length, ten inches in width (w in FIG. 4), and five inches in depth. The flat span of the belly (f in FIGS. 2B & 4) is about 4 inches long. In FIG. 3, the curved portion (p) of the opposing end plates 8A & 8B is a curve defined by a circle having a 3.75-inch radius.

Referring to FIG. 3, embodiments include a plurality of mounting rails 12 disposed in the base plate 2 and removably-attached via screw holes 16 in lip 14 extending up from rectangular section 6. The two opposing end plates SA & 8B bracket the plurality of mounting rails 12. Lip 14 includes a recessed shelf 19 for mounting holes to a cover 18. The recessed shelf 19 runs along the bay side of the base plate 2 as well as front/back allowing for a countersunk surface to attach/bolt the cover 18 to, as well as providing a seamless transition between the fuselage, structural member, and the cover.

The cover 18 is sometimes referred to by other names including an RF bay cover, RF-transparent bay cover, and bay cowling. The cover 18 configured to releasingly-attach to the baseplate 2. The cover 18 has an exterior cross-sectional U-shape defined by the exterior cross-sectional shape of the two opposing end plates 8A & 8B.

The base plate 2 is made of a structural composite to support the small UAV, in a center-of-gravity orientation. Electrical magnetic interference (EMI) shielding is incorporated. Overhead mounting is provided by rails attached to the baseplate 2 along the top of the bay 10 instead of a traditional flimsy bay lid, to provide a load bearing mounting surface. The front and back of the base plate 2 is extended down to replicate bay attachment points. With both ends being a structural member, the bay cover 18 carries no structural load, allowing the cover to be made of a lighter material. The base plate 2 enables modular clips to be used when mounting the bay to the airframe's fuselage.

The bay 10 is structurally configured around the ability to oppose axial bending and provide an adequate mounting surface for various payloads, while still retaining light weight construction characteristics. This is accomplished by one to two layers of simple carbon fiber prepreg, layered under a sandwich or foam core composite, layered under another one to two layers of prepreg. The RF cover 18 is constructed of either fiberglass or similar material that is characterized by similar RF performance. The lip 14 and recessed shelf 19 on the base plate 2 and sides is countersunk 0.030 inches to allow for a 0.030 inch cover 18 to be attached. This provides a flush seam on the outer mold line between the two joints. The cover 18 is held on by a number of 8-32 pan head #2 Drive machine screws. The bay 10 is attached to the airframe fuselage by modular clips. Additionally, attachment features 5, are shown in FIGS. 1, 2A, 2B, & 3. The attachment features 5 are extrusions, sometimes referred to as depressions or concave depressions, in the two opposing end plates 8A & 8B and assist in attaching the bay 10 to the airframe. Thus, the attachment features 5 do not perforate through the two opposing end plates 8A & SB.

The overhead bay/UAV release system 10 can be referred to as a bomb bay UAV release system, that uses an integrated system of smaller, separate systems housed within a modified overhead-mounting payload bay, including a bomb bay door mechanism 11, a rack and release system 70, a small UAV 60, and the control architecture for both the actuation, stores management, and the datalink (depicted on FIG. 8). The bomb bay door mechanism 11 is sometimes referred to as a payload bay door mechanism, door mechanism, door system, and similar variations. "Overhead" is used to refer to the bay 10 due to a small UAV being dropped from the bay. FIGS. 1 & 2B show the bay 10 and its associated components in the correct orientation for the term "overhead." FIGS. 2A & 3 illustrate the bay and associated components in an inverted orientation.

The door mechanism 11 incorporates a set of actuating doors 11A and 11B into the pod that provides an opening 22 for objects to be ejected from the payload bay 10 in a larger UAV 82. The doors 11A and 11B close after ejecting the smaller UAV 60, to resume uninhibited flight. The doors 11A and 1111 actuate by rotating internally inside the overhead bay 10, which does not violate the airframe's standard outer mold line at any time during the door actuation, and does not cause the doors to be in the air stream.

This reduces the amount of time the opening 22 is present because the opening is temporary and not permanent, thus providing no reduction in flight performance.

Figure 2A:
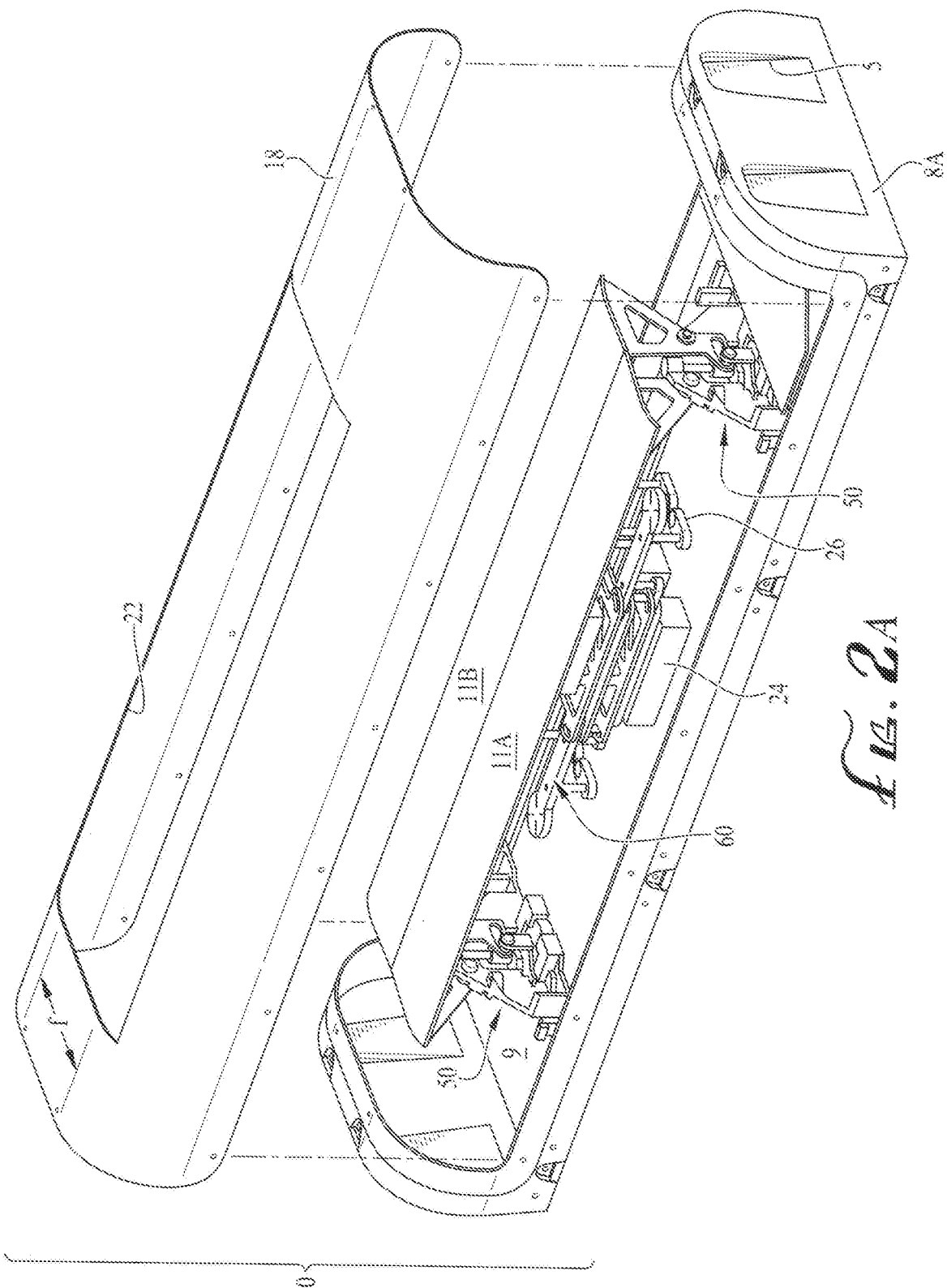
FIG. 2A is an isometric view of a partially disassembled overhead bay in an inverted orientation, with a bay cowling (cover) moved vertically for viewing purposes, according to some embodiments.
Figure 2B:
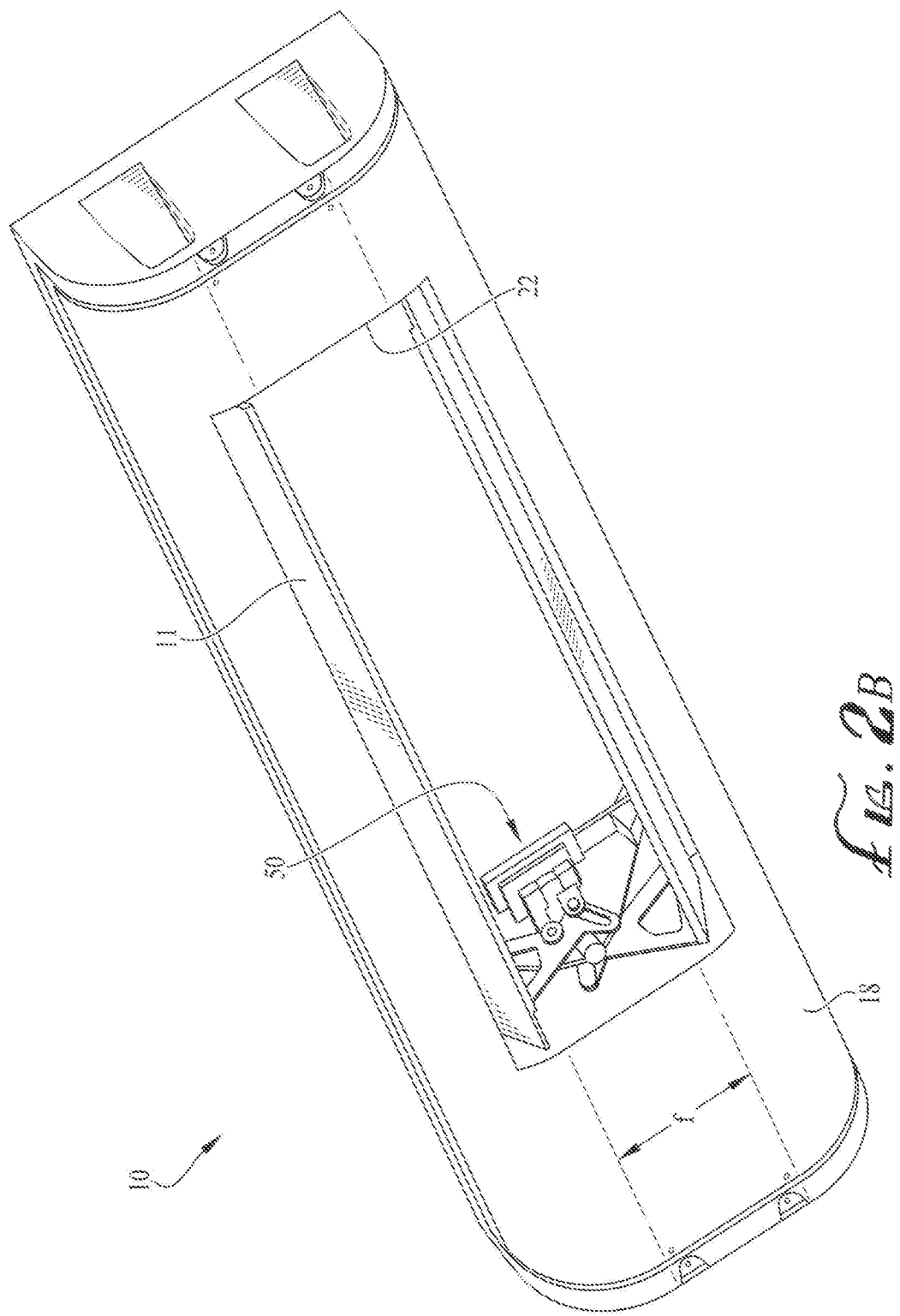
FIG. 2B is an isometric view of the overhead bay, depicted from underneath the bay, and showing bay doors open and internally rotated into the bay, according to some embodiments.

As shown in FIGS. 2A & 2B, the opening, 22, is also referred to as an aperture and similar terms, is in the cover 18. The door system 11 is actuated on either side of the opening 22 by a hinge assembly 50. The lower surface 4, which is substantially flat, of the base plate 2 interfaces with and is attached to the larger UAV 82 (FIG. 8). The baseplate 2 includes bulkhead openings 3 for electrical connection of the bay 10 with the larger UAV 82. Comparing FIGS. 1 and 2A, one can see that the lower surface 4, and the upper surface 9 of the base plate are diametrically opposed from one another. The upper surface 9, is flat, sometimes referred to as flat portion surface, and is internal to the bay 10 and is the mounting surface for the hinge assembly 50 and rack and release system 70. The upper surface/top flat portion/top flat surface 9 of the base plate and the rounded portion, sometimes referred to as a "belly" (f) portion, interface with the smaller UAV 60.

An extra/optional battery 24 is shown in FIG. 2A, for additional/optional power for either the smaller UAV 60 or bay components. Referring to FIG. 2B, the cover 18, which is substantially rounded and sometimes referred to as a belly, is in the airstream during flight. Note that the small UAV 60 is not shown in FIG. 2B for ease of viewing.

FIG. 5 depicts the hinge assembly 50. The point of actuation shown in FIG. 5 corresponds to the doors 11A & 11B being about half-open. The hinge assembly 50 includes a stepper motor 51, a lead screw 52, sometimes referred to as a lead ball screw because it uses a ball follower 41 with screw hole for translation. The stepper motor 51 is contained in a form-fitted housing 49. The form-fitted housing 49 is part of a pivot beating housing 56 and is also referred to as a hinge pin housing. The hinge assembly 50 includes a lead screw coupler 53, a clevis 54 and a set of hinges 55. The hinge assembly 50 has two hinges 55, as shown in FIG. 5. The two hinges 55 have mirrored components on either side of the hinge assembly and correspond to the two doors 11A & 11B. One hinge assembly 50 can be used, as shown in FIG. 2B, or two hinge assemblies can be used, as shown in FIG. 2A, depending on application-specific requirements. The stepper motor 51 controls both hinges 55 in the hinge assembly 50. The hinge assembly 50 has a proximal end 59A and a distal end 59B. The pivot bearing housing/hinge pin housing 56 supports and assists attaching the proximal end 59A of the hinge assembly 50 to the top flat surface 9 of the base plate 2. Attachment brackets with screw holes 44 at the proximal end 59A are used to attach the hinge assembly 50 to the top flat surface 9 of the base plate 2. The distal end 59B of the hinge assembly 50 is at the hinge 55, which is attached to its corresponding door 11A or 11B. Suitable attachment examples include screws, bolts, and glue.

Limit switches 42 provide electrical feedback to the electronic control stack 83 for verification of door positioning. Each hinge assembly 50 has two limit switches 42 (one limit switch for each hinge 55). As the stepper motor 51 receives a signal and begins to rotate, the lead screw 52 that is coupled to the stepper motor's output shaft (sometimes referred to as a power output shaft) spins. The lead screw 52 has a proximal end (not shown) and a distal end (not shown). The lead screw coupler 53 is a connector between the proximal end of the lead screw 52 and the distal end of the stepper motor's 51 power output shaft's distal end. Threaded onto the lead screw 52 is the follower 41 that fastens a clevis 54 that as a result of the stepper motor 51 turning, moves linearly up or down depending on the direction of rotation.

The follower 41 has a small screw hole for attaching to an alignment arm 43, sometimes referred to as an arm. The follower 41 houses the threads and ball screws and rides within the lead screw 52 and fastens the clevis 54 to itself.

The clevis 54 is attached at either end to a hinge 55 via a sliding clevis pin 58. The alignment arm 43, which is part of the clevis 54, extends horizontally and aligns the clevis horizontally and guides a guide rod (not shown for ease of viewing/clarity) into rod housings 45 & 47. The clevis 54 has an arm 43 extending horizontally to assist with alignment. As shown on FIG. 5, the hinge assembly 50 has two hinges 55. With the hinge 55 fastened around its own fixed hinge pin 57A as the clevis 54 moves vertically up and down, the sliding clevis pin 58 travels along a transition slot 57B in the hinge, causing the hinge to move rotationally about its own fixed hinge pin. The fixed hinge pin 57A is also referred to as a pivot bearing. The transition slot 57B is also called a transition slot housing and similar terms. The connection and movement of the sliding clevis pin 58 in the transition slot 57B is referred to as a pin-and-slot engagement. The doors 11A & 11B are sometimes referred to as door skins and are fastened onto the hinge 55 so actuation occurs, the doors will open or close depending on the direction of the stepper motor's 51 actuation.

A first rod housing 45 houses and retains one end of the guide rod. The pivot bearing housing/hinge pin housing 56 has a second rod housing 47 that houses and retains the other end of the guide rod. The first rod housing 45 and the second rod housing 47 can be considered anti-rotation and alignment features. The guide rod spans vertically through the holes in the first rod housing 45 and the second rod housing 47. The guide rod runs through a hole in the arm 43 of the clevis 54. The guide rod keeps the follower 41 and clevis 54 from rotating when the lead screw 52 is turned. As the lead screw 52 is turned, both the follower 41 and the clevis 54 travel up and down linearly due to the guide rod.

FIGS. 6A & 6B illustrate partial views, shown with reference characters 61A & 61B, of the UAV 60. The partial views 61A & 61B illustrate the retained and extended geometries, respectively, without the actual rotors and other components found on the UAV 60, for ease of viewing. The UAV 60 is configured about its frame 62. The UAV 60 is configured as a multi-rotor UAV incorporating release actuating arms 64, allowing the UAV to be released from the opening 22. Each arm 64 can be elongated by manually bending the arm about its own elbow (not shown for ease of view). The manual actuation portion of the arms 64 is not shown for ease of viewing. Each arm 64 is has a proximal end and a distal end. The proximal end of the arm 64 is attached to the frame 62 by a hinge 66. Rotor attachment points 63 are located at the distal end of the arms 64. Individual rotors are not shown for ease of view. Once in flight, the arms 64 actuate for optimal aerodynamic geometry of the rotors. The arms 64 pivot about its hinge point 66 from a first position (retained position) 61A, as shown in FIG. 6A to a second position (extended position) 61B as shown in FIG. 6B. The pivoting is in an arc slot 68, which, as configured, provides for a limited motion, sometimes referred to as a lost motion, of the arms 64.

The arms 64 fold inward towards the frame 62 center-lengthwise producing a long slender form-factor, the narrower geometry depicted in FIG. 6A. The arms 64 include a linear bearing (not shown) positioned to fit within guide posts 73. As the UAV 60 is being ejected from the bay 10, and traveling along the guide posts 73, the arms 64 remain in the retained position (FIG. 6A) until they clear the end of the posts, allowing the smaller UAV 60 to jettison away from the bay 10 with minimal interference to the control arms 64 and rotor attachment points 63 as well as the rotors. When the arms 64 are fully outside the bay 10, the arms are free to release (see FIG. 6B) and are activated via a torsion spring (not shown) at the hinge point 66 into flight position (the extended geometry 61B).

Referring to FIG. 7, the rack and release system 70 includes both retention hardware as well as an ability to eject the UAV 60 when requested. The rack and release system 70 is a locking device configured to retain the UAV 60 when the UAV is housed in the bay 10 and release the UAV through the opening 22. Cross struts 72 are attached to attachment members (rigid structural members) 65 (FIGS. 4 & 7) spanning transversely across the upper surface/flat portion surface 9 of the baseplate 2 in the payload bay 10. The cross struts 72 are configured as steel slotted rails to survive UAV takeoffs and landings. The cross struts 72 include guide posts 73 with springs 74 and non-spring-loaded posts 75. The springs 74 are cylindrical compression springs wrapped around the outside of the guide posts 73. The non-spring loaded posts 75 are sometimes referred to as guide rails. Each compression spring 74 is attached at one end to the cross strut corresponding to its respective guide post 73, while the other end of the compression spring is unattached, allowing for the compression and decompression of the spring. The guide posts 73 are positioned at either longitudinal end of the opening 22, and interface with the UAV 60.

Referring to FIGS. 4, 7, 9A, & 9B, a cover plate 76 is located at the middle of the opening 22 and covers a linear actuator 71. The cover plate 76 holds the linear actuator 71 in place with screws or bolts that span from the cover plate, through outer edges of the linear actuator, and attaches to a mounting plate 67, sometimes referred to as a linear actuator mounting plate. The linear actuator mounting plate 67 is secured to the upper surface/flat portion surface 9 of the base plate 2. An electrical wire connector 78 is generically shown and used, if needed, for powering the linear actuator 71. The electrical wire connector 78 is shown to indicate that the linear actuator 71 is powered and, as such, can have a different orientation than what is depicted such as, for example, by routing into the bay 10 through the upper surface/flat portion surface 9 or through the bulkhead openings 3. Likewise, the concept can apply to enable the UAV 60 to receive power from the larger UAV 82.

The linear actuator 71 is a servo motor that extends and retracts a linear actuator arm 79 such as, for example, using a lead screw having threads, which is shown in FIG. 9A but not explicitly referenced. As shown in FIG. 9A, the linear actuator arm 79 has a first position rest/support 31 corresponding to its retracted position, and a second position rest/support 32 corresponding to its extended position, which is a locking position. The linear actuator arm 79 is shown in its extended position 32. The figures show four guide posts 73 and four non-spring loaded posts 75, although any number of each can be used. The UAV 60 has interface bearings (not shown) that, when the UAV is in its retained orientation, are positioned over all four of the guide posts 73 and non-spring loaded posts 75, sometimes referred to as guide rails. The non-spring loaded posts 75 prevent the UAV 60 from rotating in the bay 10 when the UAV is retained. The guide posts 73 and non-spring loaded rails 75 are attached by bolts and nuts 77 to the cross struts 72. Similarly, bolts and nuts attach the linear actuator 71 and cross struts 72 to the payload bay 10.

As the UAV 60 is pressed down the length of the guide posts 73, the compression springs 74 are compressed, and the UAV touches the upper surface/top flat portion/top flat surface 9 of the base plate 2 inside the bay 10 at the end of the compression springs' travel. Once the UAV 60 is at the bottom, the linear actuator arm 79 translates longitudinally in the bay 10 by extending toward the guide posts 73 and non-spring loaded rails 75. Guiding features 26 (FIG. 2A) are attached to the underside of the UAV 60 and guide the linear actuator arm 79 toward the guide posts 73 and non-spring loaded rails 75, and perpendicular to the electrical wire connector 78, as depicted in FIG. 7. Examples of the guiding features 26 include horseshoe hooks, sometimes referred to as U-hooks or latches attached to the underside of the UAV 60, from which the linear actuator arm 79 passes through.

The force of the linear actuator arm 79 overcomes the force of the springs 74 on the guide posts 73 and retains the UAV 60 during typical flight operations. The linear actuator 71 locks and releases, causing the linear actuator arm 79 to move from its second 32 to first 31 positions, when instructed by an electrical signal from the electronic control stack 83 or the larger UAV 82 (see FIG. 8). Upon actuation of the release system 70, the linear actuators arm 79 is retracted and the latch is free causing the springs 74 to extend, pushing the UAV 60 upward along the guide posts 73. The UAV slides on the guide rails 75 until the force of the compression springs 74 jettison the UAV out of the bay 10. When released, the UAV 60 extends its spring-loaded arms 64 and the UAV is in flight.

Referring to FIG. 8, an exemplary operating system environment is depicted by reference character 80. The system 80 includes a smaller UAV 60 and a larger UAV 82. The smaller UAV 60 can be referred to as a first UAV and the larger UAV 82 can be referred to as a second UAV. The smaller UAV 60 is physically smaller than the larger UAV 82. The system 80 shows the larger UAV 82 having an electronic control stack 83 inside the payload bay 10. The electronic control stack 83, a networking datalink (sometimes called a data link network) 84, and associated ground Command and Control features, are physically located inside the payload bay 10. The electronic control stack 83 has a mother board that houses and interfaces with electrical components and hardware.

The electronic control stack 83 interfaces with the larger UAV 82 and its associated computer, micro-controller, and input power sources. Two datalink cards 85 & 87 are physically located with the airframe of the larger UAV 82 for a downlink datalink radio and uplink datalink radio, respectively. The larger UAV's 82 computer is configured with stores management features, including a graphics user interface (GUI), network translation, power conditioning, status monitoring, feedback monitoring, and enables follow-on capability via future software upgrades.

Reference character 95 is used to show wireless communication links, which can also be referred to as a wireless datalink. Components linked by the wireless datalinks 95 are configured with transmitters and receivers to send and receive instructions and images and video. The smaller UAV 60 has a high-power wireless communication module 81 that communicates with the larger UAV's 82 high-power wireless communication module 86. The smaller UAV 60 has its own dedicated ground control station (GCS) 88. Similarly, the larger UAV 82 has a GCS 90, sometimes referred to as a ground station. The smaller UAV's dedicated GCS 88 has a manual controller 89, a small GCS computer 91, such as a laptop computer, and a networking datalink system 92. The smaller UAV GCS 88 is configured for mobility, such as in a vehicle, boat, or human operator on the ground.

The larger UAV GCS 90 has a GCS computer 93 and a tracking antenna station 94 for transmitting and receiving messages from the larger UAV 82, The smaller UAV GCS 88 and the larger UAV GCS 90 can be co-located, such as a human operator in the same location as the larger UAV GCS 90, or separated by a larger distance. As such, communication between the smaller UAV GCS 88 and the larger UAV GCS 90 is either wireless or hardwired, depicted by reference character 97.

Components within the same physical structure or nearby physical structure can be linked together for powering and communication purposes. The particular linkage is shown as lines between components. For instance, the electronic control stack 83, networking datalink 84, and high-power wireless communication module 86 are linked together within the larger UAV's 82 bay 10. The two datalink cards 85 & 87 are not shown as being specifically linked, but functionally they are linked for power sharing purposes. Likewise, individual components in the smaller UAV GCS 88 are linked together. In similar fashion, the components in the larger UAV GCS 90 are linked together. Finally, due to its mobile nature, the smaller UAV GCS 88 can be linked together with the larger UAV GCS 90, such as side-by-side in the same building or many miles away from each other.

The electronic control stack 83 translates network traffic within the electronic control stack 83 using encrypted wireless methods. The electronic control stack 83 is a relay station for command and control of the smaller UAV 60 after it is released from the larger UAV 82. This allows forward positioned personnel to control the released UAV during its mission or subscribe to its payload feed from the ground. To view a feed, such as a video feed, the embodiments include a display screen(s) (not shown). The display screen(s) are associated with at least one or both of the smaller UAV GCS 88 or the larger UAV GCS 90. The display screen(s) allow ground user(s) to perform additional visual verification, which is very helpful prior to dedicating additional resources to a location. Additionally, since network translation is performed onboard the bay's electronic control stack 83, the ground user can seamlessly receive and send commands, view streamed video from the smaller UAV 60, and network enable other ground users to receive the same.

While the embodiments have been described, disclosed, illustrated and shown in various terms of certain embodiments or modifications which it has presumed in practice, the scope of the embodiments is not intended to be, nor should it be deemed to be, limited thereby and such other modifications or embodiments as may be suggested by the teachings herein are particularly reserved especially as they fall within the breadth and scope of the claims here appended.

What is claimed is:

1. An unmanned aerial vehicle (UAV) release apparatus, comprising:
   a payload bay, comprising:
   a baseplate having a rectangular body section and two opposing end plates, wherein said rectangular body section has an upper surface, a lower surface, four exterior side surfaces, and four interior side surfaces, wherein each of said two opposing end plates perpendicularly extends up from said upper surface at a different short end of said rectangular body section than the other of said two opposing end plates;
   said four interior side surfaces comprising two diametrically-opposed lengthwise interior surfaces and two diametrically-opposed widthwise interior surfaces, wherein a plurality of mounting rails are attached to said upper surface and adjacent and attached to each of said two diametrically-opposed lengthwise interior surfaces of said rectangular body section, wherein said two opposing end plates bracket said plurality of mounting rails;
   a lip portion in said rectangular body section, said lip portion having a recessed shelf with countersunk surface, said recessed shelf with countersunk surface positioned peripherally around said rectangular body section; and
   a radio frequency (RF)-transparent bay cover releasingly-attached to said recessed shelf with countersunk surface, said RF-transparent bay cover having an exterior cross-sectional U-shape defined by the exterior cross-sectional shape of said two opposing end plates, wherein a length of said RF-transparent bay cover is equal to a length between said two opposing end plates;
   said RF-transparent bay cover having an opening so dimensioned for said UAV to jettison from said payload bay;
   a payload bay door mechanism attached to said payload bay, wherein said payload bay door mechanism is configured to open by rotating internally inside said payload bay;
   a rack and release system attached inside said payload bay, wherein said rack and release system is configured to retain an unmanned aerial vehicle (UAV) inside said payload bay;
   wherein said UAV is housed inside of said payload bay and attached to said rack and release system;
   wherein said rack and release system is configured to eject said UAV from said payload bay after said payload bay door mechanism is opened; and
   an electronic control stack located in said payload bay, wherein said electronic control stack is configured for command and control of said UAV after ejection from said payload bay.

2. The apparatus according to claim 1, said payload bay door mechanism, comprising:
   at least one internally opening door configured for sealing said opening in said RF-transparent bay cover; and
   a hinge assembly having a proximal end and a distal end, wherein said proximal end is attached to said upper surface of said base plate and said distal end is attached to said at least one internally opening door.

3. The apparatus according to claim 2, said hinge assembly, further comprising:
   a reversible electric stepper motor for rotating a power output shaft, said motor corresponding to said proximal end of said hinge assembly, said power output shaft having a distal end extending from said motor;
   a lead screw having a proximal end and a distal end, said proximal end coupled to said distal end of said power output shaft; and
   a clevis attached to said distal end of said lead screw;
   wherein said clevis is coupled to a hinge by a sliding clevis pin in a pin-and-slot engagement, wherein said slot is a transition slot.

4. The apparatus according to claim 1, said rack and release system, further comprising:
   a plurality of cross struts attached to said upper surface of said baseplate;
   each cross strut in said plurality of cross struts having at least one guide post and at least one guide rail;
   wherein said at least one guide post and at least one guide rail extending vertically and pointing toward said opening in said RF-transparent bay cover;

a cylindrical compression spring wrapped about the circumference of said at least one guide post and fixed on one end to the cross strut corresponding to said at least one guide post; and a linear actuator having an electric motor, wherein said linear actuator is attached to said upper surface of said base plate, said linear actuator having a linear actuator arm with a first and a second position, said first position corresponding to a retracted position, said second position corresponding to an extended position, wherein said electric motor is configured to actuate said linear actuator arm between said first and said second positions upon receiving an instruction from said electronic control stack.

5. The apparatus according to claim 1, said electronic control stack, further comprising:
a computer configured to receive and process control instructions for controlling said UAV;
wherein said computer configured to communicate said control instructions to said UAV.

6. The apparatus according to claim 2, wherein said at least one internally opening door is two internally opening doors.

7. A system for releasing a first unmanned aerial vehicle (UAV) from a second UAV, wherein said first UAV is physically smaller than said second UAV, said system, comprising:
a first UAV;
a second UAV having a payload bay configured to house said first UAV, said payload bay, further comprising:
a baseplate having a rectangular body section and two opposing end plates, wherein said rectangular body section has an upper surface, a lower surface, four exterior side surfaces, and four interior side surfaces, wherein each of said two opposing end plates perpendicularly extends up from said upper surface at a different short end of said rectangular body section than the other of said two opposing end plates;
said four interior side surfaces comprising two diametrically-opposed lengthwise interior surfaces and two diametrically-opposed widthwise interior surfaces, wherein a plurality of mounting rails are attached to said upper surface and adjacent and attached to each of said two diametrically-opposed lengthwise interior surfaces of said rectangular body section, wherein said two opposing end plates bracket said plurality of mounting rails;
a lip portion in said rectangular body section, said lip portion having a recessed shelf with countersunk surface, said recessed shelf with countersunk surface positioned peripherally around said rectangular body section; and
a radio frequency (RF)-transparent bay cover releasingly-attached to said recessed shelf with countersunk surface, said RF-transparent bay cover having an exterior cross-sectional U-shape defined by the exterior cross-sectional shape of said two opposing end plates, wherein a length of said RF-transparent bay cover is equal to a length between said two opposing end plates;
said RF-transparent bay cover having an opening so dimensioned for said first UAV to jettison from said payload bay;
wherein said first UAV and said second UAV in communication through a wireless datalink;
a first UAV ground control station in communication with said second UAV through said wireless datalink; and
a second UAV ground control station in communication with said second UAV through said wireless datalink;
wherein said second UAV is configured to release said first UAV upon instruction from one of said first UAV ground control station or said second UAV ground control station.

8. The system according to claim 7, further comprising a wireless communication link associated with each of said first UAV, said second UAV, said first UAV ground control station, and said second UAV ground control station, wherein said wireless communication link is configured for communication between said first UAV and said second UAV, between said first UAV ground control station and said second UAV, and between said second UAV and said second UAV ground control station, wherein said first UAV ground control station in communication with said second UAV through said wireless datalink.

9. The system according to claim 7, wherein said second UAV further comprising:
a payload bay door mechanism attached to said payload bay, wherein said payload bay door mechanism is configured to open by rotating internally inside said payload bay;
a rack and release system attached inside said payload bay, wherein said rack and release system is configured to retain said first UAV inside said payload bay;
wherein said first UAV is housed inside of said payload bay and attached to said rack and release system;
wherein said rack and release system is configured to release said first UAV from said payload bay after said payload bay door mechanism is opened; and
an electronic control stack located in said payload bay, wherein said electronic control stack is configured for command and control of said first UAV after ejection from said payload bay.

10. The system according to claim 9, said payload bay door mechanism, comprising:
at least one internally opening door configured for sealing said opening in said RF-transparent bay cover; and
a hinge assembly having a proximal end and a distal end, wherein said proximal end is attached to said upper surface of said base plate and said distal end is attached to said at least one internally opening door.

11. The system according to claim 10, said hinge assembly, further comprising:
a reversible electric stepper motor for rotating a power output shaft, said motor corresponding to said proximal end of said hinge assembly, said power output shaft having a distal end extending from said motor;
a lead screw having a proximal end and a distal end, said proximal end coupled to said distal end of said power output shaft; and
a clevis attached to said distal end of said lead screw;
wherein said clevis is coupled to a hinge by a sliding clevis pin in a pin-and-slot engagement, wherein said slot is a transition slot.

12. The system according to claim 9, said rack and release system, further comprising:
a plurality of cross struts attached to said upper surface of said baseplate;
each cross strut in said plurality of cross struts having at least one guide post and at least one guide rail;
wherein said at least one guide post and at least one guide rail extending vertically and pointing toward said opening in said RF-transparent bay cover;

a cylindrical compression spring wrapped about the circumference of said at least one guide post and fixed on one end to the cross strut corresponding to said at least one guide post; and a linear actuator having an electric motor, wherein said linear actuator is attached to said upper surface of said base plate, said linear actuator having a linear actuator arm with a first and a second position, said first position corresponding to a retracted position, said second position corresponding to an extended position, wherein said electric motor is configured to actuate said linear actuator arm between said first and said second positions upon receiving an instruction from said electronic control stack.

13. The system according to claim 9, wherein said electronic control stack, further comprising:

a computer configured to receive and process control instructions for controlling said first UAV;

wherein said computer configured to communicate said control instructions to said first UAV.

14. The system according to claim 10, wherein said at least one internally opening door is two internally opening doors.

\* \* \* \* \*